M. J. KAUFFMANN.
Fifth-Wheel for Vehicles.
No. 214,400. Patented April 15, 1879.
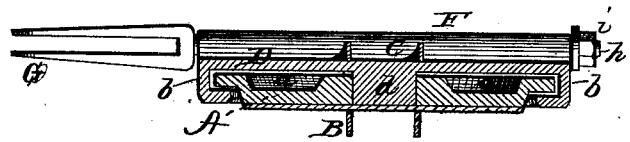
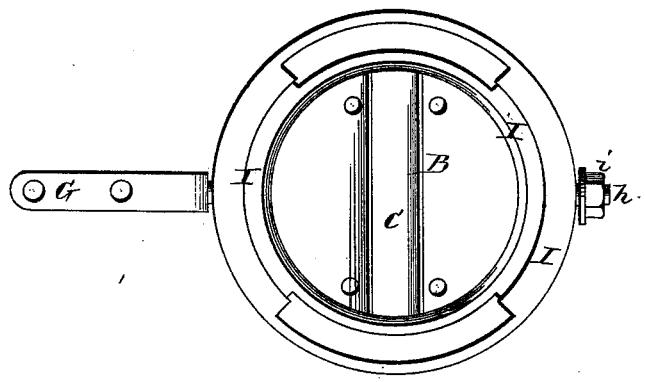

UNITED STATES PATENT OFFICE.

MOSES J. KAUFFMANN, OF ARCOLA, ILLINOIS.

IMPROVEMENT IN FIFTH-WHEELS FOR VEHICLES.

Specification forming part of Letters Patent No. 214,400, dated April 15, 1879; application filed November 18, 1878.

*To all whom it may concern:*

Be it known that I, MOSES J. KAUFFMANN, of Arcola, in the county of Douglas, and in the State of Illinois, have invented certain new and useful Improvements in Fifth-Wheels for Vehicles; and do hereby declare that the following is a full, clear, and exact description thereof, reference being had to the accompanying drawings, and to the letters of reference marked thereon, making a part of this specification.

The nature of my invention consists in the construction and arrangement of a fifth-wheel for vehicles, as will be hereinafter more fully set forth.

In order to enable others skilled in the art to which my invention appertains to make and use the same, I will now proceed to describe its construction and operation, referring to the annexed drawings, in which—

Figure 1 is a bottom view of my fifth-wheel. Fig. 2 is a longitudinal section of the same.

A represents the lower part of the fifth-wheel, made in the form of a circular plate or disk, with a flanged plate, B, attached centrally on its under side to fit over the axle, and attached thereto by suitable bolts. In the upper side of the disk A is formed an annular recess, a, which constitutes an oil-chamber, as shown. In the center of the disk A is made a circular orifice to receive a round pin, d, projecting downward from the center of the upper part, D, of the fifth-wheel. This upper part, D, is also in the form of a circular plate or disk, and has on its upper side a flanged plate, C, in which the spring-block of the vehicle is to fit.

The disk D is, around its periphery, provided with a downwardly-projecting flange, b, which encircles the lower disk, A, and the two disks are connected together by means of a double clutch, as shown at I I.

On the top of the disk D, which is, by suitable bolts, firmly secured to the spring-block, is attached a central tube, F, at right angles to the flanged plate C. Through this tube is passed a rod, h, having a nut, i, screwed on its forward end, and to the rear end is fastened a clip, G, to receive the front end of the reach or coupling-pole of the vehicle. This rod and tube form a swivel for coupling the reach to the fifth-wheel, thereby overcoming all strain that would occur on the king-bolt and fifth-wheel, rendering them less liable to breakage, and obtaining a more easy action.

The pin d forms the king-bolt, and by forming a part of one-half of the fifth-wheel it avoids all strain or jar while in use.

Having thus fully described my invention, what I claim as new, and desire to secure by Letters Patent, is—

The combination of the bottom plate, A, having annular oil-chamber a, the top disk, D, with central pin, d, and circumferential flange b, the double clutches I I, tube F, and swiveled rod h, with clip G and nut i, all constructed substantially as and for the purposes herein set forth.

In testimony that I claim the foregoing I have hereunto set my hand this 22d day of October, 1878.

MOSES J. KAUFFMANN.

Witnesses:
W. T. SYLVESTER,
WILLIAM F. WALKER.